Feb. 14, 1950 L. BREWTON 2,497,205
ELECTRIC COOKING APPLIANCE
Filed Oct. 30, 1947 4 Sheets-Sheet 1
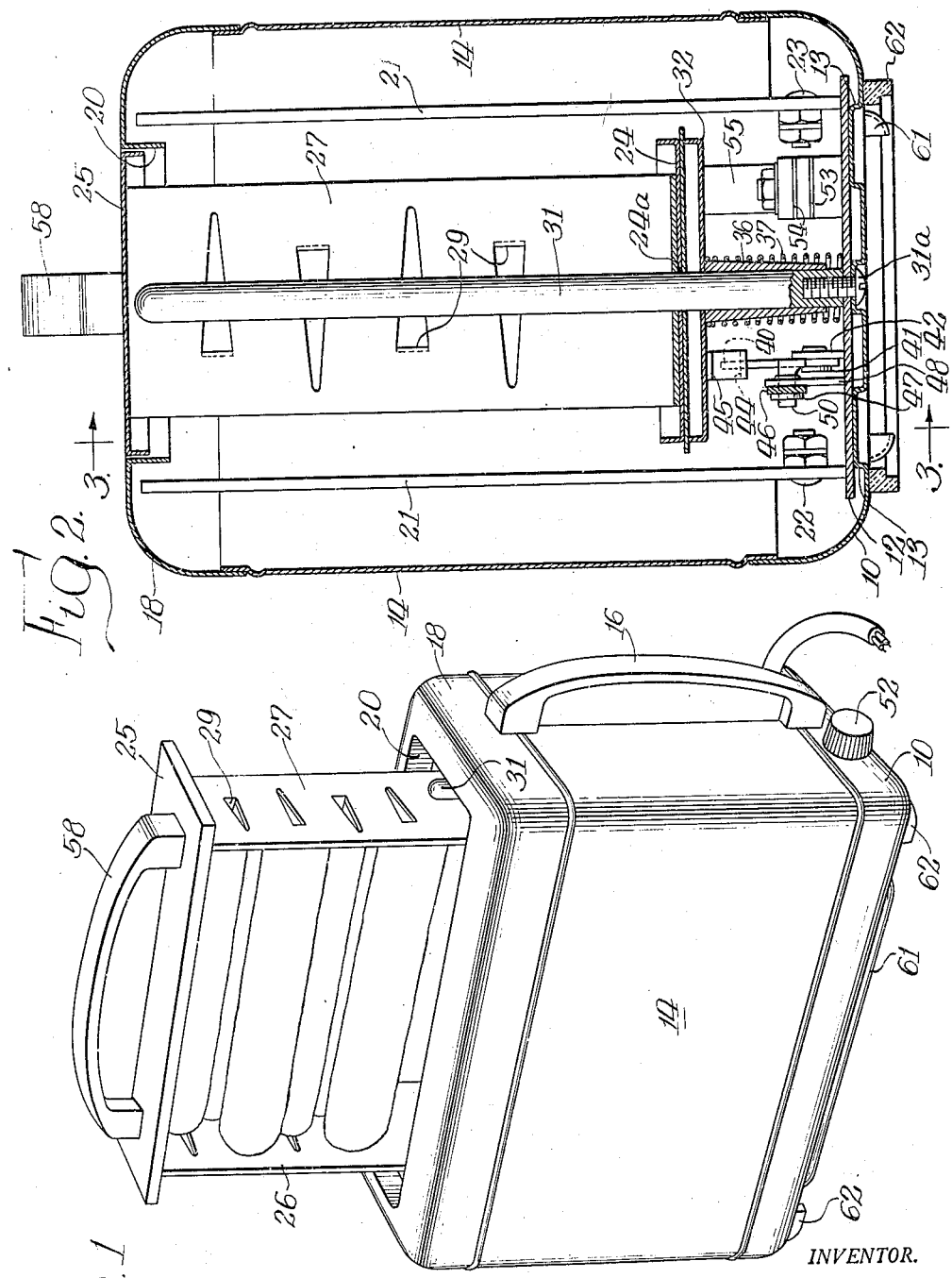
INVENTOR.
LEE BREWTON
BY Stanley Howes
Atty.

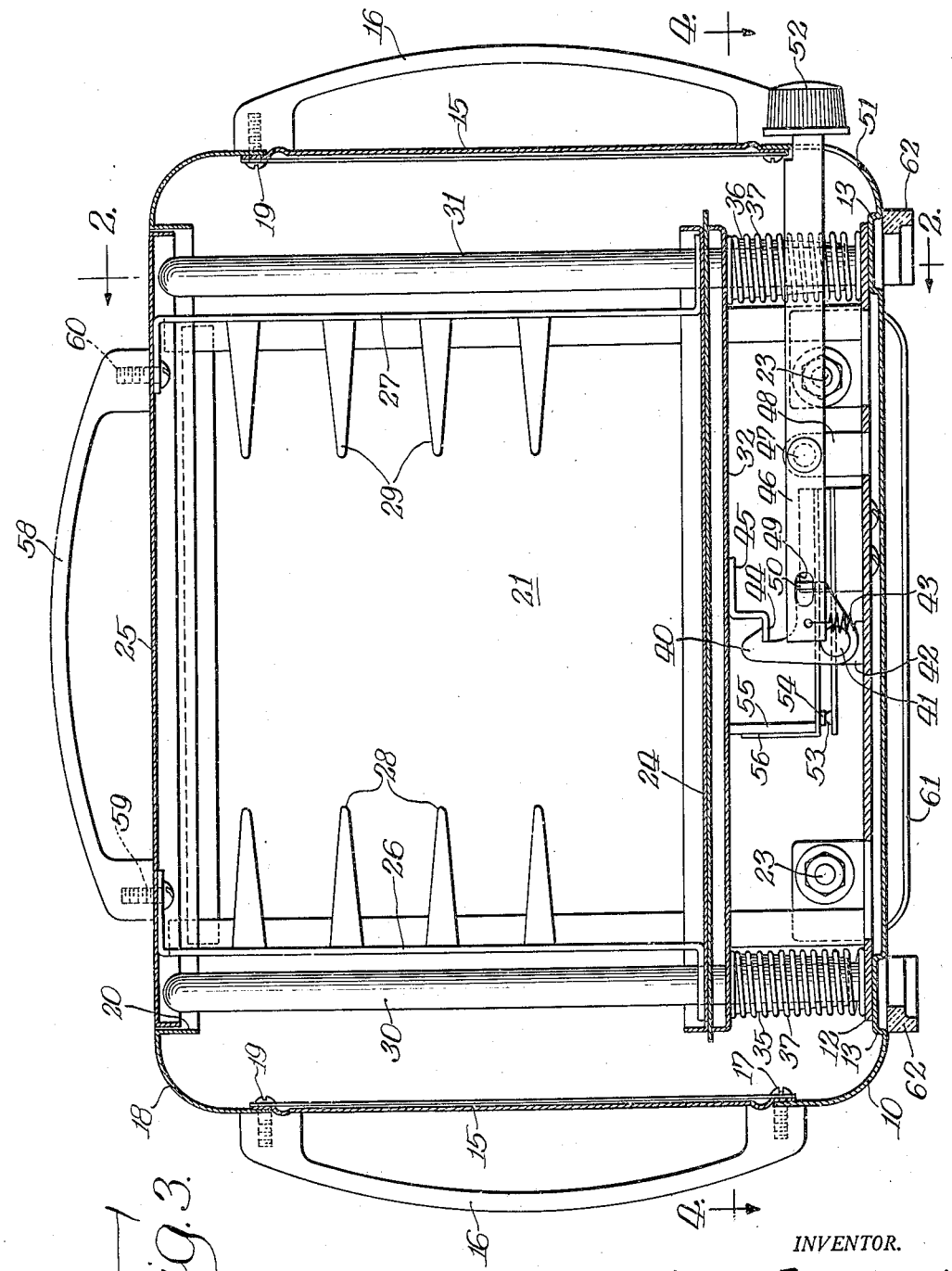

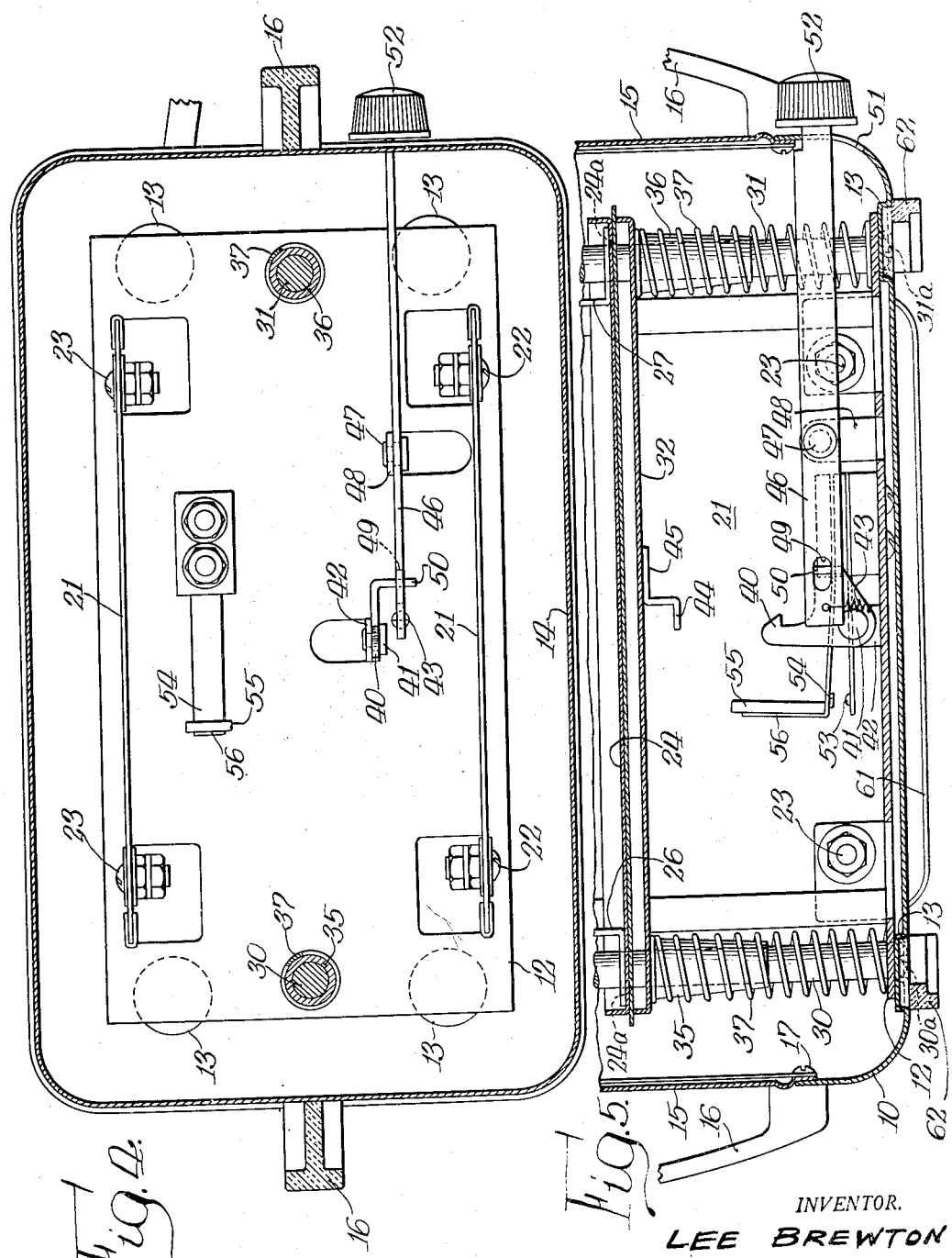

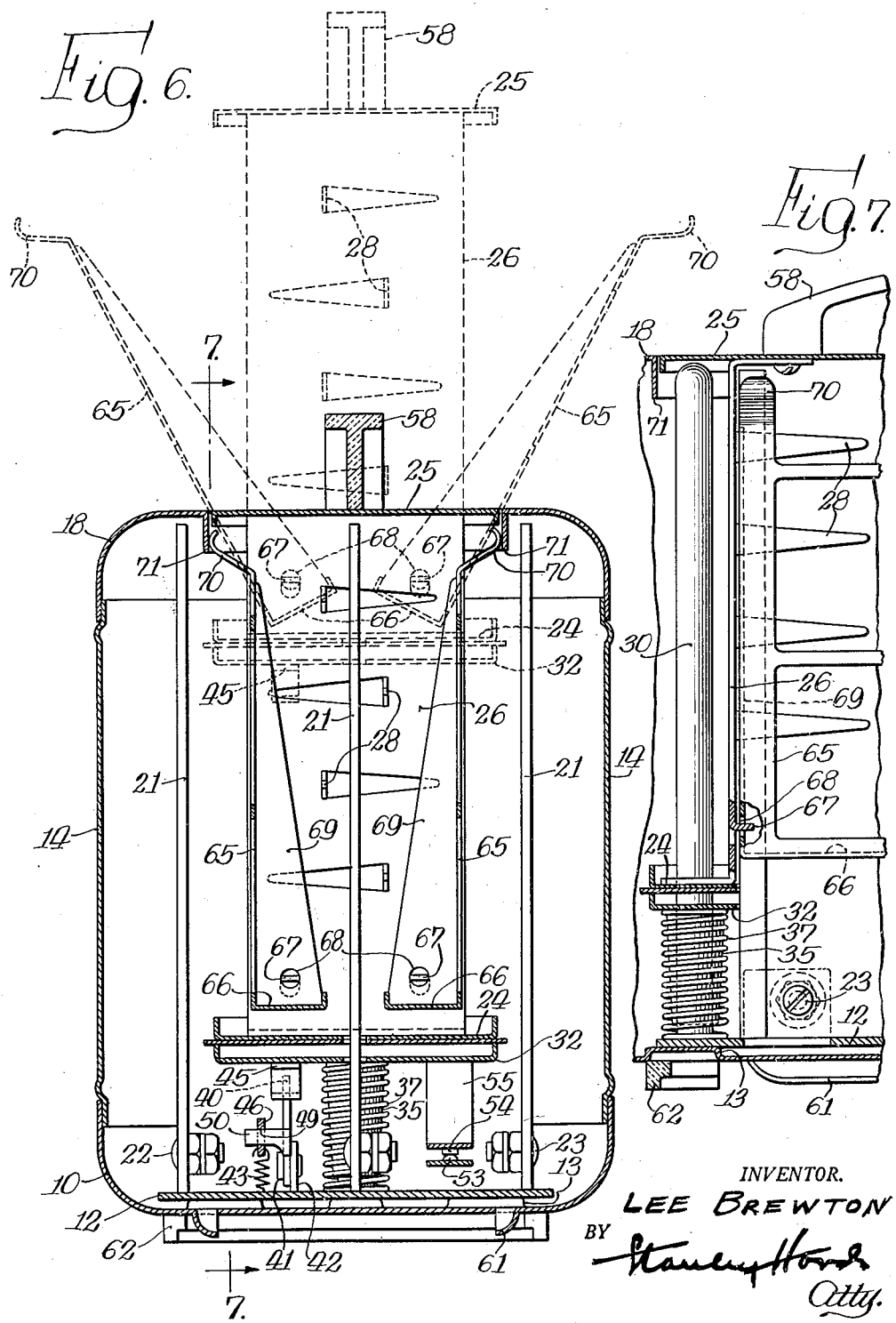

Patented Feb. 14, 1950

2,497,205

UNITED STATES PATENT OFFICE 2,497,205

ELECTRIC COOKING APPLIANCE

Lee Brewton, Melrose Park, Ill., assignor to Federated Machine Products Inc., Chicago, Ill., a corporation of Illinois Application October 30, 1947, Serial No. 783,004

10 Claims. (Cl. 99—391)

This invention relates to an electric cooking appliance whereby articles of food may be cooked in a convenient and sanitary manner.

It is an object of the invention to provide a device of this character having a cooking chamber defined by a housing having an opening in its top wall and a rack or holder for supporting articles of food and conveying the same toward and away from a lowered position within said chamber.

It is also an object of this invention to provide an electric cooking appliance having certain improvements which make for simplicity in construction and economy in manufacture as well as maximum durability.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein is shown, for illustrative purposes, one of the many embodiments which the present invention may take:

Fig. 1 is a perspective view of an electric cooking appliance embodying this invention showing the food supporting member in raised, inoperative position relative to the heating apparatus.

Fig. 2 is an enlarged vertical sectional view taken along line 2—2 of Fig. 3, with the food supporting member in lowered, operative position relative to the heating apparatus.

Fig. 3 is an enlarged vertical sectional view taken along line 3—3 of Fig. 2.

Fig. 4 is an enlarged horizontal sectional view taken along line 4—4 of Fig. 3.

Fig. 5 is an enlarged fragmentary view similar to Fig. 3 showing the food supporting member in raised, inoperative position relative to the heating apparatus and the position of the locking mechanism under corresponding conditions.

Fig. 6 is an enlarged vertical sectional view showing a modified form of the present invention.

Fig. 7 is an enlarged fragmentary sectional view taken on line 7—7 of Fig. 6.

Referring more particularly to the drawing, 10 is an upwardly flanged bottom member which is formed with upwardly projecting bosses 13 at each corner thereof on which a base plate 12 is supported in upwardly spaced relation to the upper surface of said member 10. Upright members 14, having lower edges embraced by the upper edges of the flanged portion of the member 10, overlap as at 15 to provide a continuous enclosure rising upwardly from the member 10. Handles 16 in alignment with and projecting outwardly from said overlapping portions 15 are secured to said portions 15 by means of screws 17 which also pierce the flanged portion of the member 10. A top member 18 has a downwardly flanged portion corresponding to the upwardly flanged portion of the member 10 which embrace the upper edges of the upright members 14 and are connected thereto by means of screws 19 which also pierce the overlapped portions 15 of the upright members 14 as well as the handles 16. Thus the bottom member 10, upright wall members 14 and the top member 18 are held in rigid assembly by means of the screws 17 and 19 which also anchor the handles 16 thereto. The top member 18 is provided with a central opening 20 of rectangular plan through which access is available to the interior of the housing.

Arranged adjacent the inner face of each of two opposite side walls of the housing provided by the upright members 14 is a vertical partition 21 having a heating element of suitable type supported thereon and provided with suitable electrical connections or terminals as at 22 and 23.

A rack or holder for supporting and transporting or conveying articles of food toward and away from a position to be acted upon by said heating elements comprises a bottom section 24, a top section 25 and upright end walls 26 and 27 connecting said top and bottom sections respectively in spaced, parallel vertical relation. Prongs 28 and 29 punched and bent inwardly from the end walls 26 and 27, respectively, provide spindles or pins on which articles of food, such as a frankfurter may be impaled and suspended horizontally during the heating and cooking operation. A peripheral lip around the bottom section 24 of the rack is adapted to retain grease and drippings produced in connection with the cooking operation.

The rack or holder described above is mounted for vertical movement toward and away from a lowered operating position within the housing and between said heating elements carried on the partitions 21 by means of spaced parallel posts or pillars 30 and 31 rising perpendicularly upward from and secured to the bottom member 10 and base plate 12 as at 30ª and 31ª, respectively, with which posts suitable openings 24ª formed in the bottom portion 24 of the rack cooperate to guide the rack in a fixed vertical path. A longitudinally bored stop 35 secured to the underside of the tray 32 in coaxial relation to one of the openings 24ª and a similar stop 36 secured to the tray 32 in coaxial relation to the other of the openings 24ª each provide a bearing slidably engaging the posts 30 and 31 and also provide a surface at the lower end with which the base plate 12 is engageable to position the rack at a predetermined distance above the plate 12 corresponding to the lowermost or operative position of the rack relative to the heating elements. A compression spring 37 surrounding the lower end of each post 30 and 31 acts between the base plate 12 and the stops 35 and 36 to yieldably resist movement of the rack toward its lowermost position whereby movement of the rack into such lowermost position effects a direct compression of the spring 37.

A latch member 40 in the form of an arm pivoted at 41 on a bracket 42 on the base plate 12 is normally urged by a spring 43 to a latching position in which the arm is adapted to engage the horizontal lip 44 of a bracket 45 secured to the underside of the bottom portion of the tray 32 when the tray is moved into lowermost position as in Fig. 3 whereby the tray is locked in such position. A trip lever 46 pivoted as at 47 on a bracket 48 on the base plate 12 has one end provided with a slot 49 in which a lateral tongue 50 on the arm of the latch member 40 has lost motion engagement. The other end of the lever 46 projects outwardly through a slot 51 in the housing and is fitted with an operating knob or handle 52. Upon depressing the handle 52 against the force of the spring 43 to rock the opposite end of the lever 46 upwardly, the tongue 50 is acted upon by the edge of the slot 49 to move the latching member 40 to a non-latching position relative to the lip 44 of the bracket 45 carried by the tray 32. The tray 32 is accordingly released to elevate the rack for supporting the food to be cooked due to the lifting force exerted by the compression springs 37.

A switch for controlling current to the electrical connections of the heating elements includes a fixed contact 53 and a spring or movable contact 54 insulatedly secured on the bottom plate 12. The movable contact 54 is normally spaced above and out of engagement with the contact 53. An extension member 55 of insulating material secured as at 56 in upright relation to and upon the arm of the contact 54 is depressed by the tray 32 when the latter is moved into a position to be latched as described above, whereby the contact 54 is pressed into engagement with the contact 53 to complete the circuit to the heating elements. Consequently, upon depression of the operating knob 52 to unlatch the tray 32 and elevate the food holding rack, under the force of the springs, the contact 54 is disengaged from the contact 53 so as to open the circuit to the heating elements.

The top wall 25 of the rack is substantially flush with the upper surface of the housing section 18 surrounding the opening 20 when the rack is in latched lowered position as shown in Fig. 3, and the dimension of the top wall 25 is such that it provides a closure for said opening. A handle 58 preferably conforming to the shape and design of the handles 16 is secured as at 59 and 60 on said top wall of the rack whereby the latter may be conveniently gripped and lifted from the housing to facilitate loading or unloading of articles of food supported thereon.

The bottom wall of the housing is provided with pressed-out portions 61 to afford openings for air to pass upwardly through the area between the heating elements carried on the partitions 21. The housing bottom member 10 is also spaced vertically from the surface or table on which it is used by means of feet 62, of heat resistant material, fastened thereto by means of the screw 30ª and 31ª which fasten the posts 30 and 31 to the member 10 and plate 12.

In accordance with a modified construction of the present invention, as shown in Fig. 6 and 7, an additional heating element 21' is arranged midway between and parallel to the heating elements 21 shown in Fig. 2 and a suitable opening formed in the bottom section 24 of the rack or holder heretofore described provides clearance required for vertical movement of the rack relative to the middle heating element. By means of bread slice carrying frames mounted between the upright end walls 26 and 27 for movement in unison with the rack comprising a pair of reticulated panels 65, each provided with a laterally extending support or ledge 66 along the lower end thereof, the opposite faces of a pair of bread slices carried on the ledges 66 of the panels 65 are positioned on opposite sides of the middle heating element 21 and the outer faces of the bread slices are exposed to the outermost heating elements 21 when the rack is in lowered position as shown in full lines in Fig. 6. Ears or lugs 67 cut and stamped inwardly from the upright end walls 26 and 27 of the rack cooperate with openings 68 formed in end walls 69 of the panels 65 to provide an axis about which the panels 65 may have vertical pivotal movement relative to the rack. Each panel 65 has its mass so distributed relative to its pivotal connection with the rack as to be biased by gravity toward an outwardly rocked position as shown in dotted lines in Fig. 6. Thus, when the rack is in elevated position the panels 65 are tilted outwardly so as to position the bread slices thereon at an angle favorable to easy unloading from as well as loading of slices thereon. Extensions 70 projecting laterally outwardly from the upper limits of the panels 65 each presenting an externally convex surface adapted to bear against the surface of a downwardly extending rim 71 at the edge of the central opening 19 in the top member 18 of the housing to position the panels 65 in parallel relation to the heating elements 21 when the rack is in lowered position. During movement of the rack between an elevated position, as shown in dotted lines in Fig. 6, and a lowered position, the extensions 70 and the rim 71 cooperate to gradually move the panels 65 toward a position in parallel relation to the heating elements 21. The prongs 28, in the construction shown in Figs. 6 and 7, also provide guards adapted to engage and maintain the bread slices out of contact with the middle heating element 21.

What is claimed is:

1. In an electric cooking appliance the combination of means including upright side wall members forming a housing having an opening in the top wall thereof, a rack, a pair of vertical posts supported within said housing on which said rack is slidable between a lowered position within said housing and a raised position projecting from said housing, each of said posts having free upper ends to accommodate removal of the rack therefrom when the rack is in raised position, electric heating elements arranged at opposite sides of the path of said rack within the housing, means for latching the rack in lowered position and simultaneously operative to close an electric circuit through said heating elements.

2. In an electric cooking appliance as defined in claim 1 including a top wall on said rack adapted to occupy a position substantially flush with the upper surface of the housing surrounding said opening in the top wall thereof and of a dimension to provide a closure for said latter opening.

3. In an electric cooking appliance as defined in claim 1 including a tray having vertical sliding movement on said vertical posts, on which tray said rack is supported for movement between said lowered and raised positions.

4. In an electric cooking appliance as defined in claim 1 including a tray having vertical sliding movement on said vertical posts, on which tray said rack is supported for movement between said lowered and raised positions, and means for obstructing movement of said rack downwardly beyond a predetermined lowered position including stops projecting downwardly from the lower surface of and secured to said tray.

5. In an electric cooking appliance as defined in claim 1 including a tray having vertical sliding movement on said vertical posts on which tray said rack is supported for movement between said lowered and raised positions, and means cooperating with the underside of said tray operative to bias said tray into a position wherein said rack is urged toward raised position including a compression coil spring surrounding the lower extremities of each of said vertical posts.

6. In an electric cooking appliance as defined in claim 1 wherein said rack is provided with upright end walls, and inwardly projecting prongs are formed in said end walls.

7. In an electric cooking appliance as defined in claim 1 including bread slice carrying frames mounted on said rack for relative vertical swinging movement between a position wherein said frames are parallel to the heating elements and relatively outwardly swung position.

8. In an electric cooking appliance as defined in claim 1 including bread slice carrying frames mounted on said rack for relative vertical swinging movement between a position wherein said frames are parallel to the heating elements and a relatively outwardly swung position, and biased toward said latter position.

9. In an electric cooking appliance as defined in claim 1 wherein said rack is provided with upright end walls, bread slice carrying frames mounted between said end walls for relative swinging movement between a position wherein said frames are parallel to the heating elements and a relatively outwardly swung position, and prongs formed in and projecting inwardly from said end walls providing guards for limiting movement of a bread slice relative to said frames in directions inwardly of said frames.

10. In an electric cooking appliance as defined in claim 1 including bread slice carrying frames mounted on said rack for relative vertical swinging movement between a position wherein said frames are parallel to the heating elements and a relatively outwardly swung position, and biased toward said latter position, and extensions at the upper limits of said frames presenting an externally convex surface adapted to bear against the edge of the opening in the top of the housing during movement of the rack between an elevated position and a lowered position.

LEE BREWTON.

REFERENCES CITED

The following references are of record in the file of this patent:

UNITED STATES PATENTS

| Number | Name | Date |
| --- | --- | --- |
| 997,653 | Doersch | July 11, 1911 |
| 1,369,758 | Chippindale | Feb. 22, 1921 |
| 1,624,893 | Marsden | Apr. 12, 1927 |
| 2,031,330 | Padelford et al. | Feb. 18, 1936 |
| 2,217,450 | Newell | Oct. 8, 1940 |